United States Patent [19]

Laughton

[11] 4,160,724
[45] Jul. 10, 1979

[54] WASTE WATER TREATMENT

[75] Inventor: Richard V. Laughton, Milton, Canada

[73] Assignee: Ontario Research Foundation, Sheridan Park, Canada

[21] Appl. No.: 916,868

[22] Filed: Jun. 19, 1978

Related U.S. Application Data

[63] Continuation-in-part of Ser. No. 741,221, Nov. 12, 1976, abandoned.

[51] Int. Cl.$^2$ ............................................. C02C 1/06
[52] U.S. Cl. ........................................... 210/7; 210/14;
210/16; 210/18; 210/DIG. 28
[58] Field of Search ................................. 210/2–5,
210/7, 8, 14–16, 18, DIG. 28, 195 S, 202

[56] References Cited

U.S. PATENT DOCUMENTS

| | | | |
|---|---|---|---|
| 3,579,431 | 5/1971 | Meiring et al. | 210/DIG. 28 |
| 3,817,857 | 6/1974 | Torpey | 210/DIG. 28 |
| 3,964,998 | 6/1976 | Barnard | 210/16 |
| 3,980,556 | 9/1976 | Besik | 210/DIG. 28 |
| 4,008,159 | 2/1977 | Besik | 210/14 |
| 4,011,156 | 3/1977 | Dubach et al. | 210/DIG. 28 |
| 4,056,465 | 11/1977 | Spector | 210/DIG. 28 |

FOREIGN PATENT DOCUMENTS

| | | | |
|---|---|---|---|
| 47-17266 | 9/1972 | Japan | 210/DIG. 28 |
| 51-8754 | 1/1976 | Japan | 210/DIG. 28 |

*Primary Examiner*—Benoit Castel
*Attorney, Agent, or Firm*—Sim & McBurney

[57] ABSTRACT

Removal of nitrogenous and carbonaceous contaminants is carried out in a single sludge two-tank system by a symbiotic two-step process whereby the second tank mainly oxidizes ammonia to nitrate and the first tank mainly reduces nitrate to nitrogen gas. The biological sludge is the same in both tanks but different reactions occur as the mixed microbial population moves through various environmental conditions in the tanks. Most of the carbonaceous material is removed in the first tank by a combination of biological uptake with cell growth and use of the carbon as a final electron acceptor in respiratory denitrification.

7 Claims, 3 Drawing Figures

WASTE WATER TREATMENT

REFERENCE TO RELATED APPLICATION

This application is a continuation-in-part of earlier filed copending application Ser. No. 741,221 filed Nov. 12, 1976, and now abandoned.

FIELD OF INVENTION

The present invention is directed to the treatment of waste water, such as domestic or industrial sewage, for the removal of contaminants therefrom.

BACKGROUND TO THE INVENTION

Waste water contains a variety of contaminants including biodegradable carbonaceous material, nitrogenous material, which is mainly ammoniacal or other non-nitrate and/or non-nitrite form, and phosphate material and such contaminants must be removed before the waste water can be reused.

SUMMARY OF INVENTION

In accordance with the present invention, carbonaceous and nitrogenous contaminants in waste water are removed in a two-stage single sludge process, wherein the waste water in the first stage is subjected to mainly anoxic conditions to remove nitrate and/or nitrite nitrogen (denitrification) along with carbonaceous material as nitrogen and carbon dioxide gases and in the second stage is subjected to mainly aerobic conditions to convert ammoniacal nitrogen to nitrate and/or nitrite nitrogen (nitrification). Liquor is recycled from the second stage to the first stage to introduce the nitrate nitrogen resulting from the aerobic conditions to the first stage.

The procedure is usually carried out in two reaction tanks in which the two stages are respectively effected. In each tank, the reactions are effected on the incoming liquor along a downwardly-flowing flow path. The liquor is circulated internally of each tank using an air-lift to maintain the mixed liquor as a substantially uniform suspension within the tank.

A single mixed microbial sludge is used in the process and the different reactions occur as the sludge moves through differing environmental conditions. The predominant biological reactions which occur at any given point in the system depend on the form and availability of carbon, nitrogen and dissolved oxygen at that point.

Waste water which is treated by the process of the invention and having a low residual carbonaceous and nitrogen contaminant concentration usually is forwarded to a sludge separation step wherein suspended sludge is separated from the treated waste water. Separated suspended sludge is recycled to the second treatment stage.

The process of the invention may be combined with additional processing for further purification of the waste water. It is preferred to forward effluent from the sludge separation step to a chemical treatment for the precipitation of phosphorus, and in this way, phosphorus contamination of the initial waste water is decreased to a low level.

BRIEF DESCRIPTION OF DRAWINGS

FIG. 3 is a plan view of the clarifier unit of the treatment plant of FIG. 1.

DESCRIPTION OF PREFERRED EMBODIMENT

Figure 1:
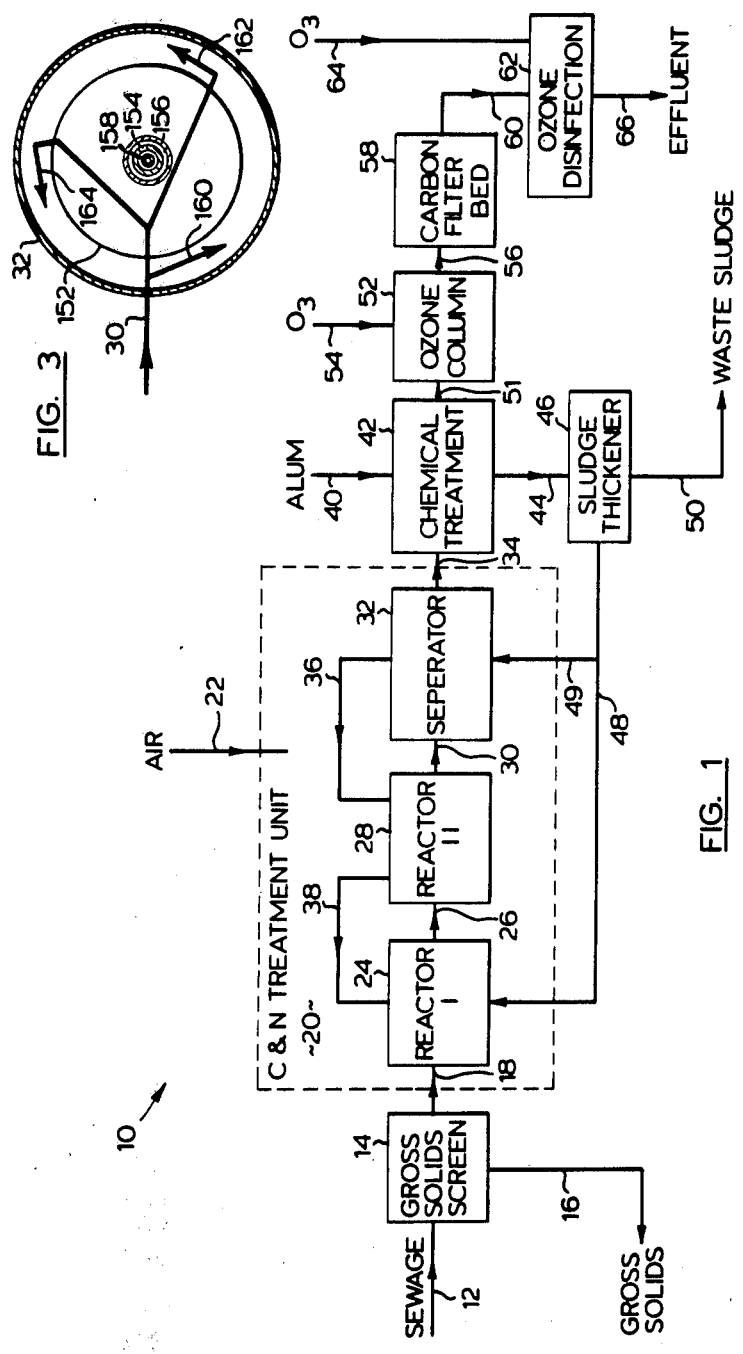
FIG. 1 is a schematic representation of a flow sheet of a waste water treatment plant incorporating the present invention.

Referring first to FIG. 1, there is illustrated a waste treatment plant 10 comprising a number of renovation steps for the removal of contaminants from the waste water.

Raw ground sewage, or other waste material to be treated, is fed by line 12 to a gross solids screen 14 for the removal of gross solids, which are collected by line 16 for disposal. Any desired form of screen may be used. If desired, the gross solids screen 14 may be omitted.

Raw screened sewage then is fed by line 18 to an integrated carbon and nitrogen treatment unit 20 utilizing the process of the invention and described in more detail below with reference to FIGS. 2 and 3, wherein carbonaceous material and nitrogenous material together with some phosphate material, are removed by biological reactions of oxidation and reduction with activated sludge and air fed by line 22 and by cell growth.

The raw screened sewage passes by line 18 to a first reactor tank 24, by line 26 to a second reactor tank 28 and by line 30 to a sludge separator 32 before discharge of carbonaceous material- and nitrogenous material-depleted water from the treatment unit 20 by line 34.

Within the treatment unit, settled activated sludge is recycled from the sludge separator 32 to the second reactor 28 by line 36 and mixed liquor solids are recycled from the second reactor 28 to the first reactor 24 by line 38.

The treated water in line 34 is contacted with alum fed by line 40 in a chemical treatment tank 42 to cause deposition of phosphate. The chemical treatment tank 42 may take the form described in U.S. Pat. No. 4,008,159. As described in this U.S. patent, chemical treatment to remove phosphorus is effected by feeding a mixture of water containing phosphorus materials and alum into a rotating fluidized bed of chemical sludge, chemically coagulating the phosphorus material within the fluidized bed, recycling liquor from the fluidized bed to the feed mixture to maintain the fluidized bed and separating treated liquid from the fluidized bed. In this procedure, the amount of alum added and the recycle ratio are dependent on one another. In this regard, optimum phosphate removal has been found to occur with a recycle ratio between about 1:1 and 1:3 and an alum feed of about 180 to 200 mg/l.

Any excess sludge formed in the treatment unit 20 is allowed to overflow from the sludge separator 32 with the liquor in line 34 into the chemical treatment tank 42 and is collected therein along with the chemical sludge produced from the alum treatment.

The sludge collected in the chemical treatment tank 42 is periodically or continuously removed by line 44 into a sludge thickener 46. Liquor separated from the sludge thickener 46 may be cycled to the treatment unit 20 by line 48 to the first reactor 24, may be passed by line 49 to the sludge separator 32 or is recycled to the chemical treatment inlet line 34, depending on the water quality of the liquor. Waste sludge is removed by line 50 for disposal.

The chemically treated liquor is passed by line 51 to an ozone treatment column 52 to which ozone is fed by line 54 for removal of further contaminants before passage by line 56 to a filtration bed 58 for removal of suspended solids.

The filtration bed may be backwashed from time to time to remove accumulated solids. The backwash effluent may be stored and forwarded to the chemical treatment tank 42 during operation of the waste treatment plant 10.

Purified liquid from the carbon filter bed 58 may be passed to storage or by line 60 to a disinfection tank 62 to which ozone is fed by line 64, before discharge of the effluent by line 66.

Figure 2:
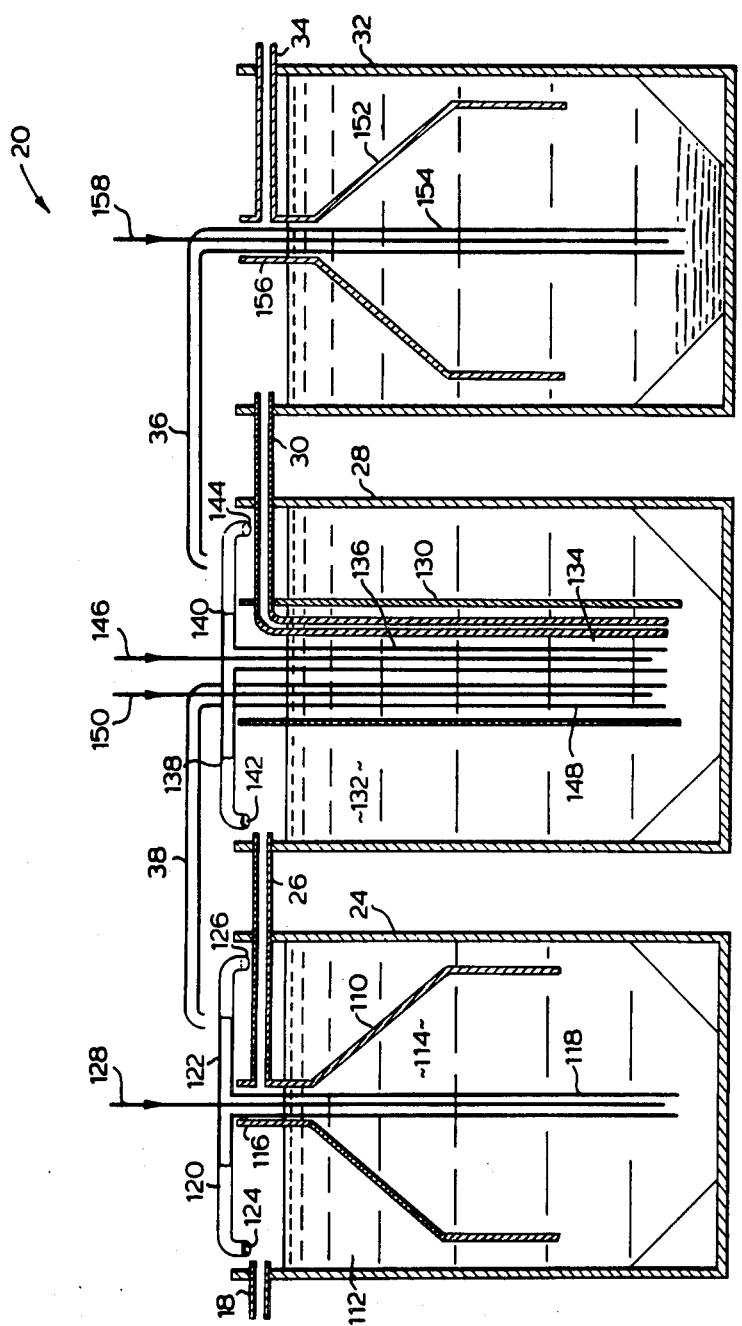
FIG. 2 is a schematic sectional view of the carbon and nitrogen removal unit of the treatment plant of FIG. 1 and provided in accordance with one embodiment of the invention.

Turning now to consideration of FIG. 2, which illustrates in more detail one embodiment of the treatment unit 20, each of the tanks, namely the first reactor 24, the second reactor 28 and the sludge separator 32, is in the form of an upright cylindrical tank having a frusto-conical insert at the lower portion thereof to avoid the accumulation of sludge in the bottom corners of each tank.

The first reactor tank 24 has an inverted funnel 110 located therein separating the tank 24 into a first zone 112 located between the inner wall of tank 24 and the outer surface of the inverted funnel 110 and a second zone 114 located within the funnel 110 and communicating with the first zone 112 only at the lower end of the funnel 110. A liquor flow path through the first reaction tank 24, therefore, is established downwardly through the first zone 112 from the screened raw sewage inlet 18 and upwardly through the second zone 114 to the discharge pipe 26 communicating with the neck 116 of the inverted funnel 110.

In an alternative structure, the inverted funnel 110 may be omitted entirely and, to prevent short circuitry of liquid flow through the tank 24, the discharge pipe 26 may extend downwardly into the tank 24 to communicate with liquor at an intermediate level in tank 24. A similar arrangement is described below in connection with tank 28.

A pipe 118 extends axially of the inverted funnel 110 through the neck 116 and the second zone 114 to a location adjacent the bottom of the tank 24.

A pair of arms 120, 122 extend radially of the reaction tank 24 from the upper end of the pipe 118 to a location adjacent the inner wall of the tank 24 where they communicate with discharge pipes 124, 126 located adjacent the intended liquid level in the first zone 112.

The pipe 118, arms 120, 122 and discharge pipes 124, 126 establish a flow path from the lower end of the tank 24 to the upper portion of the first zone 112 out of fluid flow communication with the liquor in the tank 24 other than at the lower end of the pipe 118 and allows internal recycle of the mixed liquor in the tank 24.

A second axial pipe 128 extends through the pipe 118 to the lower end thereof and is used to convey air or another oxygen-containing gas into the tank 24 at the lower end of the pipe 118 to maintain the internal liquor recycle.

The second reactor tank 28 has a cylindrical sleeve 130 extending axially of the tank 28 defining a first zone 132 located between the inner wall of the tank 28 and the outer surface of the sleeve 130. The sleeve 130 may be omitted, if desired.

A liquor flow path through the second reaction tank 28, therefore, is established downwardly through the first zone 132 from the inlet pipe 26 to the discharge pipe 30 which extends to the lower end of the sleeve 130. Liquor flow through the combination of the two reactor tanks 24 and 28 therefore passes downwardly from the sewage entrance pipe 18 around the outside of the inverted funnel 110, upwardly to the discharge pipe 26 inside the inverted funnel 110, and downwardly from the entrance pipe 26 around the outside of the sleeve 130 to the discharge pipe 30 inside the sleeve 130. Where the funnel 110 is omitted and the discharge pipe 26 extends downwardly into the tank 24, then liquor flow in the first tank 24 passes downwardly from the sewage entrance pipe 18 to the discharge pipe 26.

If desired, the second reaction tank 28 may be provided with an inverted funnel identically to the tank 24 with the discharge pipe 30 communicating with the upper end of the inverted funnel, in which case liquor flows upwardly inside the funnel to the discharge pipe 30.

A pipe 136 extends axially of the sleeve 130 from the top thereof through the internal zone 134 of the sleeve 130 to adjacent the bottom of the tank 28. A pair of arms 138 and 140 extend radially of the reaction tank 28 from the upper end of the pipe 136 to a location adjacent the inner wall of the tank 28 where they communicate with discharge pipes 142 and 144 located adjacent the intended liquid level in the first zone 132.

The pipe 136, arms 138, 140 and discharge pipes 142, 144 establish a flow path between the lower end of the tank 28 to the upper portion of the first zone 132 out of fluid flow communication with the liquor in the tank 28 other than at the lower end of the pipe 136 and allows internal recycle of mixed liquor in the tank 28.

A seond axial pipe 146 extends through the pipe 136 to the lower end thereof and is used to convey air or other molecular oxygen-containing gas into the tank 28 at the lower end of the pipe 136 to maintain the internal liquor recycle and provide the required oxygen, as discussed below.

A third pipe 148 extends downwardly internally of the sleeve 130 in parallel fashion to the pipe 136 to a location adjacent the lower end of the tank 28 and communicates at its other end with recycle pipe 38 extending to the first tank 24. The third pipe 148 and the pipe 38 establish a flow path from the lower end of the second tank 28 to the upper portion of the first zone 112 in the first tank 24 for recycle of mixed liquor from the second tank 28 to the first tank 24.

A fourth pipe 150 extends axially of the pipe 148 to adjacent the lower end thereof to feed air into the pipe 148 to achieve an air lift of mixed liquor along the recycle flow path from the second tank 28 to the first tank 24.

The sludge separator tank 32 has an inverted funnel 152 located therein separating the clarifier into zones to establish a flow path of liquor from the inlet pipe 30 first downwardly between the outer wall of the inverted funnel 152 and the inner wall of the tank 32 and then upwardly internally of the inverted funnel to the outlet pipe 34.

A pipe 154 extends axially of the inverted funnel 152 through the neck 156 to a location adjacent the bottom of the sludge separator tank 32. The pipe 154 communicates at its upper end with recycle pipe 36, so that pipes 154 and 36 establish a flow path between the lower end of the tank 32 and the upper portion of the first zone 132 in the second reaction tank 28 for the recycle of settled sludge to the second reaction tank 28.

A second axial pipe 158 extends internally of the pipe 154 to a location adjacent the lower end thereof to feed air into the pipe 154 to air lift settled sludge along the recycle flow path from the clarifier tank 32 to the second reaction tank 28.

The sludge which passes through the treatment unit 20 is a bulking sludge which is a combination of filamentous organisms and nitrogen gas bubbles contained within the mixed liquor. It was found that gentle stirring of the mixed liquor enhanced settling by producing coagulation of sludge particles to a heavier mass. It is preferred to provide the inflowing liquor to the sludge separator tank 32 as a slowly rotating mass outside the inverted cone 152 to improve flocculation of the sludge around the inverted cone 152 and increase the settleability of the sludge. A typical rotation speed is about 1.5 revolutions per minute.

As may be seen from the plan view of FIG. 3, rotation of the liquor within the clarifier tank 32 may be achieved by separating the incoming feed in line 30 into three separate streams 160, 162 and 164 which are discharged around the outside of the cone 156 in approximately tangential manner.

OPERATION

In the operation of the treatment unit 20, sewage or other waste water fed by line 18 to the first reaction tank 24 is mixed with recycled mixed liquor from the second tank 28 and with internally recycled mixed liquor. The recirculation rate of mixed liquor within the tank 24 is sufficient to maintain sludge in a substantially uniform suspension within the tank 24.

The dissolved oxygen in the liquor at the top of the zone 112 and oxygen picked up by the splashing of the recycle streams into the liquor in the first tank 112 to provide a momentarily higher dissolved oxygen content than in the liquor leaving tank 28 by line 38, is sufficient initially to sustain aerobic reactions in the flow path of the liquor through tank 24 including conversion of ammoniacal nitrogen to nitrate and/or nitrite nitrogen and conversion of carbonaceous material to carbon dioxide. It is preferred to provide a dissolved oxygen concentration value at the top of the zone 112 of less than about 0.5 mg/l and 0.1 mg/l or less at the bottom of zone 112.

As the liquor moves downwardly through zone 112, the oxygen available for aerobic reactions rapidly is diminished and anoxic conversion of nitrate and/or nitrite nitrogen to nitrogen gas (denitrification) with consequent consumption of dissolved carbon commences. The denitrification depletes the nitrate and/or nitrite concentration of the liquor to a low level.

Anoxic reactions predominate in the reaction tank 24 and these reactions, combined with cell growth, deplete the carbonaceous material content of the incoming sewage substantially completely. Cell growth also accounts for some nitrogen and phosphorus removal. Some mixed liquor is recycled within the tank 24 by pipe 118 and this recycled mixed liquor is oxygenated during the recycle to provide the required dissolved oxygen in the mixed liquor and mixing of the mixed liquor. Gases formed in the first reaction tank 24 are vented.

The recirculation rate of mixed liquor from the second tank 28 by line 38 is greater than the rate of flow of external liquor into the tank 24 by line 18. As the recycle rate increases, the mixed liquor volatile suspended solids concentration in the tank 24 increases which in turn increases the nitrogen removal capability of the reactor towards a maximum. Usually, the recycle rate by line 38 is about 200 to about 500% of the rate of flow of external liquor into the tank 24 by line 18.

In describing the conditions occurring in the first tank 24, we prefer to use the term "anoxic" as opposed to "anaerobic" since the latter term suggests complete absence of oxygen whereas the former term permits the presence of oxygen, as is the case in tank 24.

Mixed liquor overflowing from the tank 24 to the second tank 28 having a low dissolved carbonaceous material content and a low dissolved nitrate and/or nitrite nitrogen content but still containing the bulk of the ammoniacal nitrogen of the initial sewage, is mixed with recycled settled sludge from the sludge separator 32 and internally recycled oxygenated mixed liquor to form a mixed liquor having a high dissolved oxygen concentration at the top of the zone 132.

The rate of recycle of mixed liquor within the reaction tank 28 is considerably higher than that within the tank 24 owing to a higher dissolved oxygen concentration requirement in the tank 28 and serves to maintain the sludge in a substantially uniform suspension within the tank 28.

In the tank 28, the dissolved oxygen concentration of the mixed liquor at the top of zone 132 should be sufficient to establish mainly aerobic conditions within zone 132. Preferably, the dissolved oxygen concentration is in excess of 2 mg/l.

The aerobic conditions predominating in tank 28 result in conversion of the ammoniacal nitrogen to nitrate and/or nitrite nitrogen until the oxygen level is insufficient to sustain aerobic conditions and anoxic reactions occur. The dissolved oxygen concentration of the mixed liquor entering the pipe 148 for recycle to the first reaction tank 24 preferably is approximately that of the mixed liquor at the top of the zone 112 in tank 24, preferably less than 0.5 mg/l.

The volume of oxygen which is used by the treatment unit 20 in effecting the removal of nitrogenous and carbonaceous contaminants is considerably less than that recommended by the Environmental Protection Agency (EPA), U.S.A., for extended aeration sewage treatment plants which this system most closely resembles.

In the sewage treatment system provided in accordance with the present invention, carbonaceous material contaminants in the incoming sewage are removed mainly by oxidation by the oxygen chemically bound with nitrogen in the nitrate and/or nitrite in the first tank 24 under anoxic conditions although some carbonaceous material removal occurs by direct oxidation under aerobic conditions and cell growth. The use of the chemically bound oxygen to oxidize carbonaceous material also converts the nitrate and/or nitrite to nitrogen gas, resulting in removal of that contaminant.

In this invention, oxygen is required in the system mainly to oxidize ammoniacal nitrogen in the incoming sewage to nitrate nitrogen. This oxygen use contrasts markedly with conventional sewage treatment systems where oxygen is utilized to oxidize both carbonaceous material and ammoniacal nitrogen before subsequent removal of the resulting nitrate and/or nitrite nitrogen by biological denitrification utilizing an added carbon source, such as, methanol. It is this fundamental distinction which enables the use of substantially less oxygen than is recommended by EPA for an extended aeration plant.

The oxygen fed to the second tank 28 is controlled to provide the mainly aerobic conditions mentioned above and preferably the oxygen feed rate is controlled to ensure that anoxic or substantially anoxic conditions prevail in the liquor leaving the tank 28 for recycle to the tank 24 so that the mainly anoxic conditions are present in the tank 24 and efficient anoxic reactions can occur therein.

The rate of feed of sewage by line 18 to the treatment unit 20 may be maintained substantially constant by the use of suitable flow equalization devices. However, one of the versatilities of the treatment unit 20 is that it is capable of handling variable flows of incoming sewage up to the hydraulic limit of the system, as well as variable concentrations of contaminants in the incoming sewage, and effectively remove nitrogenous and carbonaceous materials therefrom. Where the unit 20 is operating under variable flow conditions, it is preferred also to vary the oxygen flow rate to the second tank 28 to maintain the mainly aerobic conditions in that tank and the mainly anoxic conditions in tank 24.

In the two reaction tank system used in the illustrated embodiment of the invention, the contaminants in the incoming sewage are subjected to a symbiotic process with a single biological sludge in which the contaminants are subjected first to aerobic reactions for a short period and then to anoxic reactions in the tank 24 and second to aerobic conditions for a long period and then to anoxic conditions in tank 28, with recycling from tank 28 to tank 24 to deplete nitrate and/or nitrite nitrogen.

The biological sludge in both tanks is the same but different reactions occur as the mixed microbial population moves through various environmental conditions within the tanks. The form and availability of carbon, nitrogen and dissolved oxygen at any given point in the tanks governs the predominant microbial reactions taking place at that point.

Carbonaceous material and nitrogenous material contaminants are depleted to low levels in the tanks by the aerobic and anoxic reactions occurring in the tanks, in combination with sludge cell growth. Phosphate material also is removed by sludge cell growth.

The mixed liquor from the second reaction tank 28 overflows into the sludge separator 32 wherein settling of sludge occurs allowing a supernatant clear effluent to be removed by line 34. Periodic wasting of excess sludge from the system is necessary and this is achieved by allowing sludge to overflow with the effluent in line 34 to the chemical treatment tank 42 from which it is removed with chemical sludge by line 44 to the sludge thickener 46. Alternatively, sludge may be wasted from the sludge separator tank 32 by using a sludge pump operably connected to the tank 32 or recycle line 36.

The rate of recycle of settled sludge from the sludge separator 32 by line 36 to the tank 28 is generally at least 300% of the flow of sewage to the tank 24 and at least sufficient to provide sufficient rotation of the sludge in the tank 32 to induce flocculation and provide a hydraulic loading on the sludge separator 32 which prevents anaerobic decomposition of the sludge in the separator.

The mixed liquor concentration in the second tank 28 varies from about 3000 to about 7000 mg/l, preferably about 4000 to about 5000 mg/l, corresponding to a general range of MLVSS values of about 2500 to about 6000 mg/l and a preferred range of about 3400 to about 4500 mg/l.

As mentioned above, the mixed liquor concentration in the first tank 24 is governed by the recycle rate of liquor from the second to the first tank by line 38 as compared with the incoming flow of sewage by line 18. Since the concentration of nitrate nitrogen in the liquor passing from the tank 24 to the tank 28 is decreased by an increased MLVSS concentration in the tank 24, as mentioned previously, the ratio of MLVSS concentration in tank 24 to that in tank 28 is usually high and approaches 1:1, typically about 0.8:1.

The treatment unit 20 has been found to be effective in removing nitrogenous and carbonaceous contaminants and removes about 0.006 to about 0.057 lb. (g) of ammoniacal nitrogen from sewage per lb. (g) MLVSS per day, preferably about 0.02 lb. (g) $NH_3$—N/lb. (g) MLVSS/day, about 0.011 to about 0.054 lb. (g) of total nitrogen per lb. (g) MLVSS per day, preferably about 0.031 lb. (g) TN/lb/(g) MLVSS/day, and about 0.017 to about 0.112 lb. (g) SOC/lb. (g) MLVSS/day, preferably about 0.040 lb. (g) SOC/lb. (g) MLVSS/day.

Although the efficiency of removal of contaminants from incoming raw sewage by the system described above in connection with FIGS. 1 to 3 may vary depending on various factors, consistent overall efficiencies have been experienced under various long term operating conditions of greater than about 80% removal of nitrogen, greater than about 90% removal of total organic carbon and greater than about 95% removal of $BOD_5$ by the treatment unit 20, and greater than about 95% removal of phosphorus by the treatment unit 20 and the chemical treatment tank 42.

The treatment unit 20 operates effectively in the absence of added activated carbon and it has been found that the presence of added activated carbon has little or no effect on the removal of contaminants, although such activated carbon presence may improve the settleability of the sludge.

EXAMPLES

EXAMPLE I

A waste treatment system as illustrated in FIG. 1 was operated continuously under pilot plant conditions at an average ambient temperature of about 14° C. over a period of sixteen weeks treating domestic sewage from an adjacent housing subdivision. No activated carbon was added to the system. The dimensions of the units of the system are set forth in the following Table I:

TABLE I

| Unit | Height (ft)(m) Total | Height (ft)(m) Effective | Diameter (ft)(m) | Effective Volume USG (l) |
|---|---|---|---|---|
| Reactor 24 | 10.0 (3.1) | 9.5 (2.9) | 6.5 (2.0) | 2050 (7760) |
| Reactor 28 | 10.0 (3.1) | 9.5 (2.9) | 6.5 (2.0) | 2050 (7760) |
| Separator 32 | 10.0 (3.1) | 9.5 (2.9) | 6.5 (2.0) | 987 (3736) |
| Chemical treatment 42 | 10.0 (3.1) | 8.8 (2.7) | 6.5 (2.0) | 1984 (7509) |
| Ozone col. 52 | 15.0 (4.6) | 15.0 (4.6) | 0.3 (0.1) | 22 (83) |
| Filter 56 | 10.0 (3.1) | 6.0 (1.8) | 2.0 (0.6) | 236 (893) |
| Disinfection 62 | 15.0 (4.6) | 15.0 (4.6) | 2.0 (0.6) | 353 (1336) |
| Thickener 46 | 10.6 (3.2) | 9.7 (3.0) | 4.0 (1.2) | 912 (3452) |

Flow rates of liquor through the system and air flows are set forth in the following Table II:

TABLE II

| Flow | Rate (USGPM) | ($cm^3$/sec) | Air (SCFM) | ($cm^3$/sec.) |
|---|---|---|---|---|
| Raw sewage line 12 | 7.5 | (473) | | |

TABLE II-continued

| Flow | Rate (USGPM) | (cm³/sec) | Air (SCFM) | (cm³/sec.) |
|---|---|---|---|---|
| Internal Recycle Reactor 24 | 60.0 | (3786) | 5.0 | (2360) |
| Reactor 28 to Reactor 24 line 38 | 12.0 | (757) | 0.5 | (236) |
| Sludge Thickener liquor in line 48 or line 49 | 2.0 | (126) | 0.25 | (118) |
| Line 26 | 21.5 | (1357) | | |
| Internal Recycle Reactor 28 | 240.0 | (15144) | 25.0 | (11800) |
| Separator 32 to Reactor 28 line 36 | 22.0 | (1388) | 2.0 | (944) |
| Line 30 | 31.5 | (1988) | | |
| Line 34 | 9.5 | (600) | | |
| Input to chemical treatment 42 | 17.0 | (1073) | 0.5 | (236) |
| Chemical treatment 42 recycle | 7.5 | (473) | | |
| Line 51 | 7.5 | (473) | | |
| Line 44 | 2.0 | (126) | | |
| Line 56 | 7.5 | (473) | | |
| Line 60 | 7.5 | (473) | | |
| Line 66 | 7.5 | (473) | | |

During the test period, the water quality of incoming sewage and final effluent were determined for samples taken every 15 minutes for 24 hours a day. Weekly means values for the various contaminants were determined. These results appear in the following Table III:

TABLE III

| Week No. | $NH_3$-N mg/l Sewage | Effluent | $NO_3$-N mg/l Sewage | Effluent | $NO_2$-N mg/l Sewage | Effluent | TKN mg/l Sewage | Effluent | TP mg/l Sewage | Effluent | S $PO_4$-P mg/l Sewage | Effluent | TOC mg/l Sewage | Effluent | $BOD_5$ mg/l Sewage | Effluent |
|---|---|---|---|---|---|---|---|---|---|---|---|---|---|---|---|---|
| 1 | 21.4 | 0.25 | 0.1 | 8.64 | 0.1 | 0.02 | 31.4 | 0.5 | 5.3 | 0.19 | 3.7 | 0.16 | — | 4.8 | 213 | 5 |
| 2 | 24.0 | 0.07 | 0.17 | 7.49 | 0.03 | 0.01 | 26.5 | 0.5 | 5.5 | 0.12 | 4.1 | 0.16 | — | 6.6 | 189 | 5 |
| 3 | 20.1 | 0.14 | 0.15 | 8.0 | 0.08 | 0.01 | 30.5 | 0.2 | 5.8 | 0.19 | 3.5 | 0.11 | — | 5.3 | 407 | 2 |
| 4 | 22.6 | 0.07 | 0.18 | 5.69 | 0.27 | 0.02 | 31.5 | 0.2 | 4.9 | 0.08 | 3.4 | 0.13 | — | 3.5 | 394 | 4 |
| 5 | 19.2 | 0.10 | 2.09 | 3.31 | 1.04 | 0.01 | 25.7 | 0.3 | 6.2 | 0.34 | 3.3 | 0.26 | — | 3.7 | 425 | 4 |
| 6 | 19.7 | 0.05 | 3.04 | 4.62 | 0.56 | 0 | 23.5 | 0.2 | 4.8 | 0.08 | 2.3 | 0.07 | 60 | 2.9 | 173 | 5 |
| 7 | 19.9 | 0.27 | 1.26 | 2.55 | 0.18 | — | 24.8 | 1.02 | 5.7 | 0.07 | 3.9 | 0.03 | 53 | 5.5 | 143 | 3 |
| 8 | 19.4 | 0.24 | 1.28 | 2.86 | 0.16 | — | 24.8 | 0.25 | 4.4 | 0.05 | 3.2 | 0.05 | 55 | 6.2 | 122 | 3 |
| 9 | 18.9 | 0.06 | 1.61 | 4.53 | 0.16 | — | 27.5 | 0.35 | 4.3 | 0.02 | 3.5 | 0.05 | 84 | 4.9 | 146 | 2 |
| 10 | 18.2 | 0.15 | 1.07 | 4.03 | 0.17 | — | 28.1 | 0.40 | 5.0 | — | 2.9 | 0.03 | 96 | 3.7 | 118 | 2 |
| 11 | — | — | 2.40 | 6.04 | 0.44 | — | — | — | — | — | 2.9 | 0.02 | 91 | 6.0 | 138 | 5 |
| 12 | 37.5 | 0.17 | 2.91 | 3.10 | 0.69 | — | 38.0 | 0.50 | 2.9 | 0.1 | 2.5 | 0.05 | 78 | 2.4 | 147 | 1 |
| 13 | 31.6 | 0.05 | 4.91 | 2.88 | 0.42 | 0.01 | 33.4 | 0.50 | 3.6 | 0.1 | 2.4 | 0.03 | 81 | 2.5 | 119 | 1 |
| 14 | 29.0 | 0.27 | 2.87 | 3.38 | 0.43 | — | 30.8 | 0.50 | 5.6 | 0.1 | 4.0 | — | 75 | 3.2 | 121 | 1 |
| 15 | 23.7 | 0.67 | 5.64 | 4.11 | 0.18 | 0.01 | 37.5 | 1.79 | 6.4 | 0.1 | 3.7 | 0.02 | 75 | 4.2 | 139 | 2 |
| 16 | 20.6 | 1.27 | 5.31 | 5.11 | 0.50 | 0.01 | 42.3 | 2.60 | 5.5 | 0.1 | 4.4 | 0.05 | 81 | 4.2 | 161 | 2 |

NOTES
$NH_3$-N refers to ammoniacal nitrogen; $NO_3$-N refers to nitrate nitrogen;
$NO_2$-N refers to nitrite nitrogen; TKN refers to total Kjeldahl nitrogen;
TP refers to total phosphorus; $SPO_4$-P refers to soluble phosphorus;
TOC refers to total organic carbon; $BOD_5$ refers to biochemical oxygen demand.

Based on the data appearing in Table III, efficiencies of removal of nitrogen, carbon and phosphorus by the system were determined and the results appear in the following Table IV:

were taken at the input in line 18, at the effluent from the sludge separator in line 34, at the effluent from the chemical clarifier in line 51 and at the final effluent in line 66. During the same period, random determinations

TABLE IV

| Week No. | Total Nitrogen | | | Total Phosporus | | | Total Carbon | | | $BOD_5$ mg/l | | |
|---|---|---|---|---|---|---|---|---|---|---|---|---|
| | $TKN+NO_3$ Sewage | $+NO_2$ mg/l Effluent | % Removal | Sewage | mg/l Effluent | % Removal | Sewage | mg/l Effluent | % Removal | Sewage | Effluent | % Removal |
| 1 | 31.51 | 9.16 | 70.9 | 5.3 | 0.1 | 96.4 | | | | | | |
| 2 | 26.70 | 8.00 | 70.0 | 5.5 | 0.12 | 97.8 | | | | | | |
| 3 | 30.73 | 8.21 | 73.3 | 5.8 | 0.19 | 96.7 | | | | | | |
| 4 | 31.95 | 5.91 | 81.5 | 4.9 | 0.15 | 99.0 | | | | | | |
| 5 | 28.83 | 3.62 | 87.4 | 6.2 | 0.34 | 94.5 | | | | | | |
| 6 | 27.10 | 4.82 | 72.2 | 4.8 | 0.08 | 98.3 | | | | | | |
| 7 | 26.24 | 3.57 | 86.4 | 5.7 | 0.07 | 98.7 | 60 | 5.5 | 90.8 | 143 | 3 | 97.9 |
| 8 | 26.24 | 3.11 | 88.1 | 4.4 | 0.05 | 98.5 | 53 | 6.2 | 88.3 | 122 | 3 | 97.5 |
| 9 | 29.27 | 4.88 | 83.1 | 4.3 | 0.02 | 99.5 | 55 | 4.9 | 91.1 | 146 | 2 | 98.6 |
| 10 | 29.34 | 4.43 | 84.9 | — | — | — | 84 | 3.7 | 95.6 | 118 | 2 | 98.3 |
| 11 | — | — | — | — | — | — | 96 | 6.0 | 93.8 | 138 | 5 | 96.4 |
| 12 | 41.60 | 3.6 | 91.3 | 2.9 | 0.1 | 96.5 | 91 | 2.4 | 97.4 | 147 | 1 | 99.3 |
| 13 | 38.73 | 3.39 | 91.2 | 3.6 | 0.1 | 97.2 | 78 | 2.5 | 96.8 | 119 | 1 | 99.2 |
| 14 | 34.10 | 3.88 | 88.6 | 5.6 | 0.1 | 98.2 | 81 | 3.2 | 96.1 | 121 | 1 | 99.2 |
| 15 | 43.32 | 5.91 | 86.4 | 6.4 | 0.1 | 98.4 | 75 | 4.2 | 94.4 | 139 | 2 | 98.6 |
| 16 | 48.11 | 7.72 | 84.0 | 5.5 | 0.1 | 98.2 | 81 | 4.2 | 94.8 | 161 | 2 | 98.8 |

The means removal efficiencies of 82.3% for nitrogen, 93.9% for total organic carbon, 98.4% for $BOD_5$ and 97.7% for phosphorus represent very satisfactory results.

EXAMPLE II

During the period of the test results reproduced in Example I, grab samples at twice weekly intervals also were made in the two reaction tanks 24 and 28 of the volatile suspended solids (MLVSS) concentrations, oxygen uptake rates (OUR) and specific uptake rates (SUR).

The following Table V gives the volatile suspended solids concentrations and uptake rates and Table VI gives the weekly means values for contaminants in the grab samples at the various locations.

TABLE V

| Reaction Determination No. | Reactor 24 | | | Reactor 28 | | |
|---|---|---|---|---|---|---|
| | MLVSS mg/l | OUR mg/l/hr | SUR $lb^{(g)}O_2/lb^{(g)}$ MLVSS/hr | MLVSS mg/l | OUR mg/l/hr | SUR lb (g)$O_2$/lb (g) MLVSS/hr |
| 1 | 4620 | 60 | 0.013 | 3800 | 60 | 0.016 |
| 2 | 3390 | 60 | 0.018 | 3390 | 60 | 0.018 |
| 3 | 3600 | 78 | 0.022 | 4580 | 72 | 0.016 |
| 4 | 3150 | 66 | 0.021 | 3080 | 60 | 0.019 |
| 5 | 2890 | 60 | 0.021 | 3130 | 64 | 0.020 |

TABLE VI

| Week No | $NH_3$-N mg/l | | | | $NO_3$-N mg/l | | | | TKN | | | | TP mg/l | | | |
|---|---|---|---|---|---|---|---|---|---|---|---|---|---|---|---|---|
| | Sewage | Line 34 | Line 51 | Line 66 | Sewage | Line 34 | Line 51 | Line 66 | Sewage | Line 34 | Line 51 | Line 66 | Sewage | Line 34 | Line 51 | Line 66 |
| 1 | 27.8 | 1.0 | 0.30 | 0.10 | 0.12 | 7.06 | 5.63 | 9.18 | 47.9 | 1.8 | — | <0.5 | 8.0 | 4.28 | 2.12 | 0.88 |
| 2 | 28.4 | 0.6 | 0.13 | 0.06 | 0.28 | 5.57 | 7.49 | 7.03 | 58.4 | 3.2 | — | <0.5 | 8.2 | 3.53 | 0.12 | 0.13 |
| 3-4 | 32.9 | 4.2 | 0.16 | 0.02 | 0.16 | 4.98 | 4.10 | 6.79 | 55.9 | — | — | <0.5 | 7.9 | — | — | 0.12 |
| 5 | 14.5 | 6.8 | 2.85 | 0.69 | 0.11 | 1.48 | 1.98 | 3.70 | 36.4 | 9.0 | — | 0.84 | 5.7 | — | — | 0.27 |
| 6 | 18.8 | 2.5 | 0.19 | 0.20 | 0.44 | 3.91 | 2.61 | 3.34 | 34.7 | 25.3 | — | 0.04 | 6.1 | 18.30 | 0.09 | 0.09 |
| 7 | 32.7 | 0.5 | 0.13 | — | 0.16 | 1.74 | 1.21 | 3.72 | 60.2 | 2.9 | — | 0.03 | 8.3 | 1.93 | 0.05 | 0.05 |
| 8 | 29.9 | 2.8 | 0.31 | 0.15 | 0.19 | 4.90 | 3.85 | 3.52 | 52.5 | 6.2 | — | 0.85 | 9.0 | 5.05 | 0.06 | 0.05 |
| 9 | 32.2 | 0.98 | 0.16 | — | 0.23 | 5.63 | 4.36 | 4.24 | 52.1 | 1.00 | 0.98 | — | 7.7 | 2.90 | 0.75 | 0.05 |
| 10 | 23.9 | 1.00 | — | — | 0.37 | 6.18 | 4.17 | 3.33 | 43.1 | — | 1.0 | 0.05 | 6.7 | — | 0.05 | 0.03 |
| 11 | 20.0 | 2.5 | 0.25 | 0.05 | 0.11 | 4.95 | 4.39 | 3.66 | — | — | — | — | — | — | — | — |
| 15 | 34.8 | 3.7 | 1.42 | 0.52 | 0.16 | 4.96 | 2.14 | 4.12 | 62.6 | 12.0 | 3.0 | 1.60 | 7.2 | 1.5 | 0.25 | 0.10 |

| | $SPO_4P$ mg/l | | | | TOC mg/l | | | |
|---|---|---|---|---|---|---|---|---|
| | Sewage | Line 34 | Line 51 | Line 66 | Sewage | Line 34 | Line 51 | LIne 66 |
| 1 | 4.4 | 3.6 | 1.0 | — | | | 11.2 | 3.9 |
| 2 | 5.2 | 3.4 | <0.05 | — | | | 10.3 | 2.9 |
| 3-4 | 14.6 | 2.9 | <0.05 | — | | | 8.8 | 3.0 |
| 5 | 3.3 | 2.9 | <0.05 | — | | | 8.2 | 3.4 |
| 6 | 3.4 | 0.8 | <0.05 | — | | | 8.6 | 3.1 |
| 7 | 4.9 | 2.8 | <0.05 | 0.05 | | | 7.5 | 3.2 |
| 8 | 4.2 | 1.5 | 0.09 | <0.05 | 84.0 | | 12.3 | 2.4 |
| 9 | 4.4 | 2.0 | 0.04 | 0.05 | | | 12.3 | 2.4 |
| 9 | 4.4 | 2.0 | 0.04 | 0.05 | | | 7.5 | 7.5 |

TABLE VI-continued

| | | | | | | | |
|---|---|---|---|---|---|---|---|
| 10 | 3.6 | 0.95 | 0.05 | 0.05 | | 6.3 | 2.0 |
| 11 | 3.7 | 1.08 | 0.08 | — | | 7.5 | 2.6 |
| 15 | 5.1 | 0.87 | 0.08 | 0.08 | 141.0 | 7.4 | 3.0 |

The results reproduced in this Example illustrate the effect that the carbon and nitrogen treatment unit 20 and the chemical treatment have in the overall sewage treatment system of FIG. 1, the detailed results of which appear in Example I.

EXAMPLE III

During the test period of Examples I and II, random spot determinations of ammoniacal nitrogen, nitrate nitrogen and soluble organic carbon were made at various locations in the treatment unit 20. The following Table VII reproduces these results:

EXAMPLE IV

The procedure of Example I was repeated with additions of various quantities of activated carbon. Contaminants were tested using the continuous sampling (i.e. every 15 minutes) technique described in Example I and removal efficiencies were determined. Mixed liquor concentrations and uptake rates were also randomly determined.

The following Tables VIII and IX reproduce the data obtained:

TABLE VIII

| Week No. | $NH_3$-N mg/l Sewage | $NH_3$-N mg/l Effluent | $NO_3$-N mg/l Sewage | $NO_3$-N mg/l Effluent | $NO_2$-N mg/l Sewage | $NO_2$-N mg/l Effluent | TKN mg/l Sewage | TKN mg/l Effluent | TN mg/l 4) Sewage | TN mg/l 4) Effluent | % Removal | TP mg/l Sewage | TP mg/l Effluent | % Removal |
|---|---|---|---|---|---|---|---|---|---|---|---|---|---|---|
| 1 (1) | 19.6 | 1.32 | 6.98 | 5.03 | 0.18 | 0.05 | 31.9 | 3.17 | 39.06 | 8.25 | 78.9 | 7.2 | 0.1 | 98.6 |
| 2 (1) | 17.9 | 0.58 | 5.02 | 6.59 | 0.35 | 0.01 | 33.5 | 1.65 | 38.37 | 8.25 | 78.5 | 6.4 | 0.04 | 99.4 |
| 3 (2) | 21.9 | 0.24 | 3.50 | 5.39 | 0.77 | 0.01 | 37.4 | 1.00 | 41.67 | 6.40 | 84.6 | 6.6 | 0.08 | 98.8 |
| 4 (3) | 19.5 | 0.28 | 5.63 | 7.05 | 0.17 | 0.01 | 30.7 | 0.96 | 35.00 | 8.02 | 77.6 | 6.1 | 0.10 | 98.4 |
| 5 (3) | 21.7 | 0.21 | 5.63 | 5.95 | 0.36 | 0.01 | 36.1 | 1.37 | 42.09 | 7.33 | 82.6 | 5.9 | 0.05 | 99.2 |

| | $SPO_4$-P mg/l Sewage | $SPO_4$-P mg/l Effluent | TOC mg/l Sewage | TOC mg/l Effluent | TOC % Removal | $BOD_5$ mg/l Sewage | $BOD_5$ mg/l Effluent | $BOD_5$ % Removal |
|---|---|---|---|---|---|---|---|---|
| 1 | 4.0 | 0.05 | 86 | 4.8 | 94.4 | 191 | 4 | 97.9 |
| 2 | 5.0 | 0.02 | 102 | 5.4 | 94.7 | 293 | 3 | 99.0 |
| 3 | 3.4 | 0.03 | 75 | 6.1 | 91.9 | 133 | 3 | 97.7 |
| 4 | 3.5 | 0.03 | 87 | 6.9 | 92.1 | 129 | 2 | 98.5 |
| 5 | 3.4 | — | 94 | 6.2 | 93.4 | 125 | 1 | 99.2 |

Notes:
(1) In weeks 1 and 2, 200 mg/l of activated carbon was added
(2) In week 3, 400 mg/l of activated carbon was added
(3) In weeks 4 and 5, 800 mg/l of activated carbon was added
(4) TN = TKN + $NO_3$-N + $NO_2$-N

TABLE IX

| Determination No. | Reactor 24 MLVSS mg/l | Reactor 24 OUR mg/l/hr | Reactor 24 SUR lb(g)$O_2$/lb(g) MLVSS/hr | Reactor 28 MLVSS mg/l | Reactor 28 OUR mg/l/hr | Reactor 28 SUR lb(g)$O_2$/lb (g) MLVSS/hr |
|---|---|---|---|---|---|---|
| 1 | 3270 | 90 | 0.028 | 3770 | 72 | 0.019 |
| 2 | 3260 | 93 | 0.029 | 3530 | 84 | 0.024 |
| 3 | 3850 | 102 | 0.026 | 3290 | 94 | 0.029 |
| 4 | 3580 | 100 | 0.028 | 3700 | 98 | 0.026 |
| 5 | 4510 | 105 | 0.023 | 4320 | 83 | 0.019 |
| 6 | 3090 | 32 | 0.009 | 3560 | 68 | 0.019 |
| 7 | 6680 | 57 | 0.009 | 4380 | 15 | 0.003 |

Note:
Determinations Nos. 1 to 5 were made in weeks 1 and 2, determination No. 6 was made in week 3 and determination No. 7 was made in week 5.

TABLE VII

| Determination No. | $NH_3$-N mg/l Line 18 | $NH_3$-N mg/l Line 26 | $NH_3$-N mg/l Line 38 | $NH_3$-N mg/l Line 30 | $NH_3$-N mg/l Line 34 | $No_3$-N mg/l Line 18 | $No_3$-N mg/l Line 26 | $No_3$-N mg/l Line 38 | $No_3$-N mg/l Line 30 | $No_3$-N mg/l Line 34 | SOC mg/l Line 18 | SOC mg/l Line 26 | SOC mg/l Line 38 | SOC mg/l Line 30 | SOC mg/l Line 34 |
|---|---|---|---|---|---|---|---|---|---|---|---|---|---|---|---|
| 1 | 31 | 12.8 | 1.04 | 1.32 | 0.68 | 0.11 | 0.05 | 3.90 | 2.40 | 2.70 | 30 | 9 | 8 | 9 | 6 |
| 2 | 34.5 | 9.3 | 0.22 | 0.22 | 0.22 | 0.21 | 0.09 | 1.70 | 0.55 | 0.81 | 43.2 | 11 | 10 | 9 | 9 |
| 3 | 35.7 | 13 | 1.57 | 3.31 | 1.5 | 0.18 | 0.47 | 5.70 | 4.30 | 5.10 | 40 | 11 | 10 | 9 | 9 |
| 4 | 35.4 | 6.6 | 0.26 | 0.35 | 0.26 | 0.18 | 0.23 | 4.0 | 2.87 | 3.85 | 43 | 15 | 16 | 18 | 15 |
| Mean | 34.2 | 10.4 | 0.77 | 1.3 | 0.87 | 0.17 | 0.21 | 3.85 | 2.53 | 3.2 | 39 | 11 | 11 | 11 | 10 |

The results of the above Table VII illustrate the separate effects of the various components of the unit 20 on the contaminants present in the incoming sewage.

The mean removal efficiencies of 80.2% for nitrogen, 93.3% for total organic carbon, 98.5% for $BOD_5$ and 98.9% for phosphorus represent very satisfactory results but do not differ significantly from the results set forth in Example I in the absence of added activated carbon.

EXAMPLE V

Based on the data contained in the above Examples, specific preferred design parameters for the process of this invention can be compared with those of conventional activated sludge processes as set forth in the standard textbook by Metcalf and Eddy entitled "Wastewater Engineering-Collection, Treatment and Disposal" McGraw-Hill Book Company, New York, U.S.A. (1972). The comparison appears in the following Table X:

TABLE X

| PROCESS | $\theta_c$ DAYS[1] | lb(g)BOD$_5$/lb(g) MLVSS/day | lb. BOD$_5$/ 1000 ft.$^3$ | KgBOD$_5$/ 1000m$^3$ | MLSS mg/l | V/Q[2] HRS | RECYCLE[3] Q$_R$/Q |
|---|---|---|---|---|---|---|---|
| This invention | 10–20 | 0.10–0.34 | 19–70 | 1.2 to 4.4 | 4000–5000 | 7.2 | 3.0 |
| Conventional | 5–15 | 0.2–0.4 | 20–40 | 1.3 to 2.5 | 1500–3000 | 4–8 | 0.25–0.5 |
| Complete Mix | 5–15 | 0.2–0.6 | 50–120 | 3.1 to 7.5 | 3000–6000 | 3–5 | 0.25–1.0 |
| Step Aeration | 5–15 | 0.2–0.4 | 40–60 | 2.5 to 3.8 | 2000–3500 | 3–5 | 0.25–0.75 |
| Modified Aeration | 0.2–0.5 | 1.5–5.0 | 75–150 | 4.7 to 9.4 | 200–500 | 1.5–3 | 0.05–0.15 |
| Contact Stabilization | 5–15 | 0.2–0.6 | 60–75 | 3.8 to 4.7 | (4) | (5) | 0.25–1.0 |
| Extended Aeration | 20–30 | 0.05–0.15 | 10–25 | 0.6 to 1.6 | 3000–6000 | 18–36 | 0.75–1.50 |
| High-Rate | 5–10 | 0.4–1.5 | 100–1000 | 6.3 to 62.3 | 4000–10,000 | 0.5–2 | 1.0–0.5 |
| Purox | 8–20 | 0.25–1.0 | 100–250 | 6.3 to 15.6 | 6000–8000 | 1–3 | 0.25–0.5 |

Notes:
[1] $\theta_c$ refers to the mean cell residence time in the reactor.
[2] V/Q refers to the ratio of reactor volume to incoming flow rate (hydraulic retention time)
[3] Q$_R$/Q refers to the ratio of the flow rate of incoming liquor (Q) to liquor recycled from a clarifier (Q$_R$)
[4] Contact Unit (1,000–3,000) Stabilization (4,000–10,000)
[5] Contact Unit (0.5–1.0) Stabilization (3–6)

SUMMARY OF DISCLOSURE

The present invention, therefore, provides a waste water treatment system in which two fluidly-interconnected tanks and a single sludge are used to achieve symbiotic anoxic and aerobic operations to remove nitrogenous and carbonaceous materials to low residual levels. Modifications are possible within the scope of the invention.

What I claim is:

1. A method for the treatment of waste water containing contaminants including dissolved biodegradable carbonaceous material and nitrogenous material mainly in non-nitrate and/or non-nitrite form by biological consumption and conversion to gases using a single mixed microbial sludge, which consists essentially of:
  establishing a first reaction zone consisting of a first upright reaction tank containing liquor, a second reaction zone physically separate from but fluidly interconnected with said first reaction zone and consisting of a second upright reaction tank containing liquor, and a sludge separation zone physically separate from both said first and second reaction zones but fluidly interconnected with said second reaction zone and consisting of an upright sludge separator tank containing liquor,
  feeding the waste water to said first reaction zone and passing the waste water as mixed liquor in association with said single mixed microbial sludge successively through said first and second reaction zones and said sludge separation zone along a first flow path which extends from an inlet communicating with the level of liquor in said first reaction tank, downwardly within said first reaction tank into communication with an outlet from said first reaction tank, from said first reaction tank outlet to an inlet communicating with the level of liquor in said second reaction tank, downwardly within said second reaction tank into communication with an outlet from said second reaction tank, from said second reaction tank outlet to an inlet communicating with the level of liquor in said sludge separation tank, and downwardly within said sludge separation tank into communication with a clarified liquor outlet from said sludge separation tank,
  recycling said mixed liquor at a suspended solids concentration in each of said reaction zones of about 3000 to about 7000 mg/l within each reaction zone to maintain said mixed liquor substantially in suspension in each of said first and second reaction zones,
  establishing and maintaining mainly anoxic conditions in said first reaction zone for conversion of nitrate and/or nitrite nitrogen to nitrogen gas and consumption of carbonaceous material in said conversion,
  establishing and maintaining mainly aerobic conditions in said second reaction zone for conversion of nitrogenous material to nitrate and/or nitrite nitrogen and oxidation of carbonaceous material,
  said latter steps of internal recycling and establishing said anoxic and aerobic conditions in said respective reaction zones being effected by:
    establishing a second flow path within each of said reaction tanks from the bottom of the respective reaction tank to above the liquid level therein,
    passing a molecular oxygen containing gas into said second flow path in each of said reaction zones adjacent the lower end thereof at a rate at least sufficient to convey mixed liquor upwardly along said second flow path and maintain said mixed liquor in suspension in each of said tanks,
    controlling said rate of flow of said gas into said second flow path of said first reaction tank to provide a dissolved oxygen concentration in said waste liquor at the upstream end of said first flow path which is less than about 0.5 mg/l and is capable of sustaining aerobic reactions only for an initial and short portion of said first flow path through said first reaction tank, and
    controlling said rate of flow of said gas into said second flow path of said second reaction tank to provide a dissolved oxygen concentration in said waste liquor at the upstream end of said first flow path within said second reaction tank which is at least about 2 mg/l and capable of sustaining aerobic reactions for the major portion of said first flow path through said second reaction tank, recycling mixed liquor directly from said second reaction zone to said first reaction zone at a flow rate which is about 200 to about 500% of the flow rate of waste water to said first reaction zone by:
  establishing a third flow path directly from the bottom of said second reaction tank to above the liquor level in said first reaction tank, and
  passing a molecular oxygen containing gas into said third flow path adjacent the lower end thereof at a rate sufficient to convey said mixed liquor from said second reaction tank to said first reaction tank at a flow rate which is about 200 to about 500% of the flow rate of waste liquor into said first reaction tank,
controlling the dissolved oxygen concentrations in said first and second reaction zones to provide a dissolved oxygen concentration in the mixed liquor entering said third flow path for recycle from said second reaction tank to said first reaction tank which is approximately the same as the dissolved oxygen concentration in the mixed liquor at the upstream end of said first flow path in said first reaction tank and a dissolved oxygen concentration in the mixed liquor at the downstream end of said first flow path in said first reaction zone which is less than about 0.1 mg/l,
venting gases formed in said first and second reaction zones,
at least partially flocculating, separating and settling suspended sludge from treated waste water in said sludge separator tank during passage thereof along said first flow path within said sludge separation tank,
recycling settled sludge from said sludge separator tank directly to said second reaction zone at a flow rate which is at least about 300% of the flow rate of waste water to said first reaction zone and at a rate at least sufficient to prevent anaerobic decomposition of the sludge in the sludge separation zone by:
  establishing a fifth flow path directly from the bottom of said sludge separator tank to above the liquor level in said second reaction tank, and
  passing a molecular oxygen containing gas into said fifth flow path adjacent the lower end thereof at a rate sufficient to draw said settled sludge into said fifth flow path and convey the same to said second reaction tank at a flow rate which is at least about 300% of the flow rate of waste liquor into said first reaction tank, and
removing clarified treated liquor from said sludge separation zone at a rate which is the same as the rate of feed of waste water to said first reaction zone, said aerobic and anoxic conversions and sludge growth being controlled to remove from said water about 0.006 to about 0.57 lb. of said non-nitrate and/or non-nitrite nitrogenous material per lb. MLVSS per day, about 0.011 lb. to about 0.054 lb. of total nitrogen per lb. of MLVSS per day and about 0.017 to about 0.112 lb. of dissolved carbonaceous material per lb. MLVSS per day.

2. The method of claim 1 wherein the mixed liquor solids concentration in each of said second reaction zones is about 4000 to about 5000 mg/l.

3. The method of claim 1 carried out in the absence of activated carbon.

4. The method of claim 1, wherein said sludge separation tank contains an inverted funnel-like member coaxially arranged with the tank and establishing said first flow path through the tank, the mixed liquor is fed to said sludge separation tank inlet to form a rotating mass of liquor in the zone external of the funnel-like member which has a rotation rate sufficient to assist in gas separation from the sludge and assist in flocculation of filamentous organisms in the sludge.

5. The method of claim 4, wherein said mixed liquor is discharges into said external zone at the upper end thereof in a plurality of circumferentially spaced separate discharges each generally tangential to the liquor in said external zone to achieve and maintain the rotation of the mass of liquor.

6. The method of claim 1 including wasting excess sludge by allowing the same to discharge from said sludge separation zone with the treated liquor and subsequently removing excess sludge from the treated liquor.

7. The method of claim 1 including chemically treating the treated liquor from the sludge separation zone to remove phosphorus contaminants from the treated liquor as precipitated phosphorus compounds by:
  mixing about 180 to about 200 mg/l of alum with the treated liquor, feeding the mixture into a rotating fluidized bed of chemical sludge comprising precipitated phosphorus compounds, coagulating the dissolved phosphorus contaminants in a fluidized bed, removing treated liquid and chemical sludge from the fluidized bed, separating the treated liquid from the chemical sludge and removing the treated liquor, and recycling liquor from the fluidized bed to the feed mixture at a ratio of recycled liquor to feed of about 1:1 to about 1:3 to maintain the fluidized bed.

* * * * *